(12) United States Patent
Woo et al.

(10) Patent No.: US 12,339,923 B2
(45) Date of Patent: *Jun. 24, 2025

(54) PERMUTING IN A MATRIX-VECTOR PROCESSOR

(71) Applicant: Google LLC, Mountain View, CA (US)

(72) Inventors: Dong Hyuk Woo, San Jose, CA (US); Gregory Michael Thorson, Waunakee, WI (US); Andrew Everett Phelps, Middleton, WI (US); Olivier Temam, Antony (FR); Jonathan Ross, Mountain View, CA (US); Christopher Aaron Clark, Madison, WI (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,805

(22) Filed: Sep. 1, 2023

(65) Prior Publication Data

US 2024/0211534 A1    Jun. 27, 2024

Related U.S. Application Data

(63) Continuation of application No. 17/208,214, filed on Mar. 22, 2021, now Pat. No. 11,748,443, which is a
(Continued)

(51) Int. Cl.
*G06F 17/16*    (2006.01)
*G06F 7/76*    (2006.01)
(Continued)

(52) U.S. Cl.
CPC ............... *G06F 17/16* (2013.01); *G06F 7/76* (2013.01); *G06F 9/30032* (2013.01);
(Continued)

(58) Field of Classification Search
CPC ........ G06F 17/16; G06F 7/76; G06F 9/30032; G06F 9/30036; G06N 3/063; G06N 3/084
(Continued)

(56) References Cited

U.S. PATENT DOCUMENTS 4,495,598 A    1/1985    Vahlstrom et al.
4,653,019 A    3/1987    Hodge et al.
(Continued)

FOREIGN PATENT DOCUMENTS

CN    101162453 A    4/2008
CN    101482810 A    7/2009
(Continued)

OTHER PUBLICATIONS

Extended European Search Report in European Appln. No. 18157351.0, mailed on Jul. 6, 2018, 6 pages.
(Continued)

*Primary Examiner* — Tan V Mai
(74) *Attorney, Agent, or Firm* — Fish & Richardson P.C.

(57) ABSTRACT

A circuit comprises an input register configured to receive an input vector of elements, a control register configured to receive a control vector of elements, wherein each element of the control vector corresponds to a respective element of the input vector, and wherein each element specifies a permutation of a corresponding element of the input vector, and a permute execution circuit configured to generate an output vector of elements corresponding to a permutation of the input vector. Generating each element of the output vector comprises accessing, at the input register, a particular element of the input vector, accessing, at the control register, a particular element of the control vector corresponding to the particular element of the input vector, and outputting the particular element of the input vector as an element at a
(Continued)

particular position of the output vector that is selected based on the particular element of the control vector.

15 Claims, 8 Drawing Sheets

Related U.S. Application Data continuation of application No. 16/840,972, filed on Apr. 6, 2020, now Pat. No. 10,956,537, which is a continuation of application No. 16/528,826, filed on Aug. 1, 2019, now Pat. No. 10,614,151, which is a continuation of application No. 16/283,913, filed on Feb. 25, 2019, now Pat. No. 10,592,583, which is a continuation of application No. 15/966,275, filed on Apr. 30, 2018, now Pat. No. 10,216,705, which is a continuation of application No. 15/496,418, filed on Apr. 25, 2017, now Pat. No. 9,959,247.

(60) Provisional application No. 62/460,394, filed on Feb. 17, 2017.

(51) Int. Cl.
*G06F 9/30* (2018.01)
*G06N 3/063* (2023.01)
*G06N 3/084* (2023.01)

(52) U.S. Cl.
CPC ......... *G06F 9/30036* (2013.01); *G06N 3/063* (2013.01); *G06N 3/084* (2013.01)

(58) Field of Classification Search
USPC .............................................. 708/607, 209
See application file for complete search history.

(56) References Cited

U.S. PATENT DOCUMENTS

| | | | |
|---|---|---|---|
| 4,769,790 A | 9/1988 | Yamashita | |
| 4,782,457 A | 11/1988 | Cline | |
| 4,829,460 A | 5/1989 | Ito | |
| 4,831,571 A | 5/1989 | Tokumaru | |
| 4,839,839 A | 6/1989 | Tokumaru et al. | |
| 4,839,840 A | 6/1989 | Tokumaru | |
| 4,962,500 A | 10/1990 | Nakagawa | |
| 5,073,864 A | 12/1991 | Methvin et al. | |
| 5,130,941 A | 7/1992 | Kudou | |
| 5,155,698 A | 10/1992 | Niimi | |
| 5,295,250 A | 3/1994 | Komoto et al. | |
| 5,465,222 A | 11/1995 | Seckora | |
| 5,465,223 A | 11/1995 | Nichimura | |
| 5,471,628 A | 11/1995 | Phillips et al. | |
| 5,532,949 A | 7/1996 | Fujihara | |
| 5,652,718 A | 7/1997 | Thomson et al. | |
| 5,696,803 A | 12/1997 | Bartholomew | |
| 5,737,252 A | 4/1998 | Hollmann et al. | |
| 5,818,894 A | 10/1998 | Song | |
| 5,844,828 A | 12/1998 | Fujimura et al. | |
| 5,941,937 A | 8/1999 | Yamamoto et al. | |
| 5,941,938 A * | 8/1999 | Thayer .................. G06F 7/5095 708/490 | |
| 6,041,404 A | 3/2000 | Roussel et al. | |
| 6,078,937 A | 6/2000 | Vatinel | |
| 6,304,956 B1 | 10/2001 | Tran | |
| 6,314,156 B1 | 11/2001 | Moll et al. | |
| 6,877,019 B2 | 4/2005 | Bandy et al. | |
| 7,042,248 B1 | 5/2006 | Hutton et al. | |
| 7,155,601 B2 | 12/2006 | Chennupaty et al. | |
| 7,237,097 B2 | 6/2007 | Kissell et al. | |
| 7,356,676 B2 | 4/2008 | Paver et al. | |
| 7,392,368 B2 | 6/2008 | Khan et al. | |
| 7,464,255 B1 | 12/2008 | Tan et al. | |
| 7,518,400 B1 | 4/2009 | Redgrave et al. | |
| 7,761,694 B2 | 7/2010 | Abdallah et al. | |
| 7,783,690 B2 | 8/2010 | Leenstra et al. | |
| 7,933,405 B2 | 4/2011 | Knowles et al. | |
| 8,078,836 B2 | 12/2011 | Sperber et al. | |
| 8,082,526 B2 | 12/2011 | Hutton et al. | |
| 8,270,558 B2 | 9/2012 | Dielissen | |
| 8,291,002 B2 | 10/2012 | Craske | |
| 8,423,752 B2 | 4/2013 | Symes et al. | |
| 8,707,123 B2 | 4/2014 | Liu et al. | |
| 8,713,399 B1 | 4/2014 | Tsatsaragkos et al. | |
| 8,861,719 B2 | 10/2014 | Lee et al. | |
| 8,914,613 B2 | 12/2014 | Sperber et al. | |
| RE45,458 E | 4/2015 | Roussel et al. | |
| 9,058,301 B2 | 6/2015 | Agrawal et al. | |
| 9,229,718 B2 | 1/2016 | Macy et al. | |
| 9,524,168 B2 | 12/2016 | Ould-Ahmed-Vall et al. | |
| 9,672,034 B2 | 6/2017 | Sperber et al. | |
| 2004/0054877 A1 | 3/2004 | Macy et al. | |
| 2005/0289323 A1 | 12/2005 | Wong et al. | |
| 2009/0037694 A1 | 2/2009 | Luick et al. | |
| 2011/0264723 A1 | 10/2011 | Yagain | |
| 2013/0212355 A1 | 8/2013 | Mimar | |
| 2015/0127924 A1 | 5/2015 | Prasad et al. | |
| 2017/0286112 A1 | 10/2017 | Espasa et al. | |

FOREIGN PATENT DOCUMENTS

| | | | |
|---|---|---|---|
| CN | 101588182 A | 11/2009 | |
| CN | 103199873 A | 7/2013 | |
| CN | 105993178 A | 10/2016 | |
| CN | 110020404 A | 7/2019 | |
| GB | 2394571 A | 4/2004 | |
| GB | 2561674 A * | 10/2018 | ............ G06F 17/16 |
| TW | 201706917 A | 2/2017 | |
| TW | I640921 B | 11/2018 | |
| WO | WO 2006033056 A | 3/2006 | |
| WO | WO 2009144681 A | 12/2009 | |
| WO | WO 2016105819 A | 6/2016 | |

OTHER PUBLICATIONS

International Search Report issued in International Appln. No. PCT/US2018/000010, mailed on Jun. 4, 2018, 12 pages.
Office Action in Chinese Appln. No. 202010080532.6, dated Jan. 5, 2023, 18 pages (with English Translation).
Office Action in Great Britain Appln. No. GB1802586.6, dated Jun. 2, 2020, 2 pages.
Office Action in Taiwan Appln. No. 108121372, dated Jul. 6, 2020, 17 pages (with English translation).
Office Action issued in Chinese Appln. No. 201810153838.2, mailed on Mar. 27, 2019, 16 pages (with English translation).
Search and Examination Report in Great Britain Appln. No. GB1802586.6, mailed on Aug. 13, 2018, 7 pages.

* cited by examiner

PERMUTING IN A MATRIX-VECTOR PROCESSOR

CROSS-REFERENCE TO RELATED APPLICATION

This application is a continuation of U.S. application Ser. No. 17/208,214, filed Mar. 22, 2021, which is a continuation of U.S. application Ser. No. 16/840,972, filed Apr. 6, 2020, which is a continuation of U.S. application Ser. No. 16/528,826, filed Aug. 1, 2019, which is a continuation of U.S. application Ser. No. 16/283,913, filed Feb. 25, 2019, which is a continuation of U.S. application Ser. No. 15/966,275, filed Apr. 30, 2018, which is a continuation of U.S. application Ser. No. 15/496,418, filed Apr. 25, 2017, which claims the benefit of U.S. Provisional Application No. 62/460,394, filed Feb. 17, 2017, the contents of each are hereby incorporated by reference.

BACKGROUND

The specification relates to computing matrix permutations in hardware.

Generally, a matrix permutation is a computation that rearranges the columns or rows of an input matrix. A matrix permutation may be computed by multiplying an input matrix M with a permutation matrix P. The permutation matrix P is a matrix having a single one in each row and column and zeros elsewhere. Thus, the permutation matrix P may be considered an identifying matrix, i.e., a matrix having one along the principal diagonal and zeros elsewhere, having its rows or columns rearranged. Applied to the matrix M, P*M produces an output matrix having the rows of matrix M interchanged according to the permutations specified by the permutation matrix P, and M*P produces an output matrix having the columns of matrix M interchanged according to the permutations specified by the permutation matrix P.

SUMMARY

In general, this specification describes a special-purpose hardware circuit that computes matrix permutations.

In general, one innovative aspect of the subject matter described in this specification can be embodied in a circuit comprising an input register configured to receive an input vector of input elements, a control register configured to receive a control vector of control elements, wherein each control element of the control vector corresponds to a respective input element of the input vector, and wherein each control element specifies a permutation of a corresponding input element of the input vector, and a permute execution circuit configured to generate an output vector of output elements corresponding to a permutation of the input vector. Generating each output element of the output vector may comprise accessing, at the input register, a particular input element of the input vector, accessing, at the control register, a particular control element of the control vector corresponding to the particular input element of the input vector, and outputting the particular input element of the input vector as an output element at a particular position of the output vector that is selected based on the particular control element of the control vector.

Implementations can include one or more of the following features. In some implementations, the particular input element of the input vector is output to the particular position in an output register configured to receive the output vector; the output vector is output from the output register as a staggered output such that a single output element of the output vector is output at each cycle in an order beginning with a lowest-order bit position of the output vector.

Implementations can also optionally include one or more of the following features. In some implementations, the input vector is received as a staggered input such that each input element of the input vector is received at each cycle in an order beginning with a lowest-order bit position of the input vector; receiving the input vector as a staggered input vector comprises receiving, at a flattening register, each input element of the input vector in a separate cycle in an order beginning with a lowest-order bit position of the flattening register, and popping all input elements of the input vector simultaneously from the flattening register to the input register; popping all input elements of the input vector simultaneously from the flattening register to the input register comprises determining that a highest-order bit of the flattening register has received valid data, and popping all input elements of the input vector simultaneously from the flattening register to the input register in response to determining that the highest-order bit of the flattening register has received valid data; popping all input elements of the input vector simultaneously from the flattening register to the input register comprises determining that the flattening register has received a number of input elements of the input vector equal to a dimension of the input vector, and popping all input elements of the input vector simultaneously from the flattening register to the input register in response to determining that the flattening register has received the number of input elements of the input vector equal to the dimension of the input vector.

Implementations can also optionally include one or more of the following features. In some implementations, each control element of the control vector specifies a number of positions to rotate the input element in the corresponding position of the input vector; outputting the particular input element of the input vector as an output element at a particular position of the output vector that is selected based on the particular control element of the control vector comprises outputting the particular input element of the input vector to the particular position of the output register that is the specified number of positions from the position of the input element in the input vector.

Implementations can also optionally include one or more of the following features. In some implementations, each control element of the control vector is a pointer indicating a position of the output register to which the input element of the input vector is to be output; outputting the particular input element of the input vector as an output element at a particular position of the output vector that is selected based on the particular control element of the control vector comprises outputting the particular input element of the input vector at the position of the output register that is specified by the pointer of the control vector corresponding to the particular input element of the input vector.

Implementations can also optionally include one or more of the following features. In some implementations, the control vector is received from an off-chip processor that is separate from the circuit; the permute execution circuit comprises a memory crossbar; the permute execution circuit comprises multiple one-to-many multiplexors, and wherein each control element of the control vector is a control signal for controlling the output of a corresponding multiplexor of the permute execution circuit; the input vector of input elements corresponds to a row of an input matrix or a column of an input matrix.

Another innovative aspect of the subject matter described in this specification can be embodied in a circuit for permuting an input matrix, the circuit comprising an input register configured to receive an input vector of input elements that corresponds to a vector included in the input matrix, a control register configured to receive a control vector of control elements, wherein each control element of the control vector corresponds to a respective input element of the input vector, and wherein each control element specifies a permutation of a corresponding input element of the input vector, and a permute execution circuit that is configured to generate an output vector of output elements corresponding to a permutation of the input vector. Generating each output element of the output vector may comprise accessing, at the input register, a particular input element of the input vector, accessing, at the control register, a particular control element of the control vector corresponding to a particular input element of the input vector, and outputting the particular input element of the input vector as an output element at a particular position of the output vector that is selected based on the particular control element of the control vector.

Particular embodiments of the subject matter described in this application can be implemented so as to realize one or more of the following advantages. An output matrix that is a permutation of an input matrix can be generated in hardware by a special-purpose hardware circuit. The special-purpose hardware circuit is capable of performing the matrix permutation in fewer cycles than a general processor (e.g., GPU or CPU). Additionally, by generating the appropriate output using the special-purpose hardware circuit, a matrix permutation can be performed without passing data back to a host computer, i.e., without performing at least a part of the computation off-chip or in software. As a result, processing delays resulting from performing the permutation computation off-chip or in software, where the computation can be an expensive one requiring a greater number of general processor (e.g., GPU or CPU) cycles to perform than in the special-purpose hardware circuit, are avoided.

Using a hardware circuit that is specially designed to perform matrix permutations also allows for more efficient processing compared to a system that performs matrix permutations in a general matrix processing hardware circuit, e.g., one that is also configured to perform matrix convolutions or other operations, or in another special-purpose matrix processing hardware circuit, e.g., one that is configured to perform matrix transpose operations and that would also be capable of computing matrix permutations. Implementing matrix permutations on a dedicated hardware circuit permits a design that efficiently handles matrix permutation computations without concern for other matrix operation capabilities or efficiencies, and reserves other matrix processing hardware circuits for performing other matrix computations, thereby increasing the efficiency of matrix computations in hardware generally.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A matrix permutation produces an output matrix in which the rows or columns of an input matrix are rearranged. A permutation of an input matrix can be obtained by multiplying the input matrix with a permutation matrix. The permutation matrix a matrix having a single one in each row and column and zeros elsewhere. Thus, the permutation matrix may be thought of as an identity matrix, i.e., an n×n matrix having ones along its principal diagonal extending from the (0,0) position to the (n,n) position of the matrix and zeros elsewhere, in which the rows or columns of the identity matrix have been rearranged. An output matrix A computed as P*M=A contains the rows of the input matrix M rearranged as specified by the matrix P. When computed as M*P=A, the output matrix A contains the columns of the input matrix M rearranged as specified by the matrix P.

Matrix permutations are implicated in a number of practical applications. For example, matrix permutations may be computed when training a neural network. For example, to backpropagate gradients when training a neural network, a permutation of a weight matrix used in a layer of the neural network may be computed. In other instances, matrix permutations may be obtained as a part of performing computations to determine an inference of a neural network or an output of a layer of a neural network, or may be performed on a matrix output of a layer of a neural network.

Matrix permutations are computed frequently in linear algebra computations. For instance, certain mathematical properties of permutation matrices make them particularly useful in simplifying more complex algebraic computations. One such property is that the inverse of a permutation $P^{-1}$ is equivalent to its transpose $P^T$, which enables, for a simple example, easier solving of the common matrix computation, P*A=L*U, because $A=(P^T*L)*U$, thereby by eliminating the need to perform row interchanges or to otherwise compute an inverse $P^{-1}$.

Practical applications of matrix permutations may extend beyond those described above. For example, permutations of data may enable more rapid data processing by rearranging elements in memory, for example, to perform matrix computations or other computations. Digital images represented as matrices of pixel data may be manipulated using matrix permutation. For example, matrix permutations may be used to perform vertical or horizontal flips of the digital image. Other applications, including those frequently utilizing the above-mentioned neural networks, also frequently require computations using matrix permutations.

This specification describes special-purpose hardware circuitry that processes an input matrix or vector to generate a permutation of the input matrix, i.e., an output matrix having the rows or columns of an input matrix rearranged according to a specified permutation.

Figure 1:
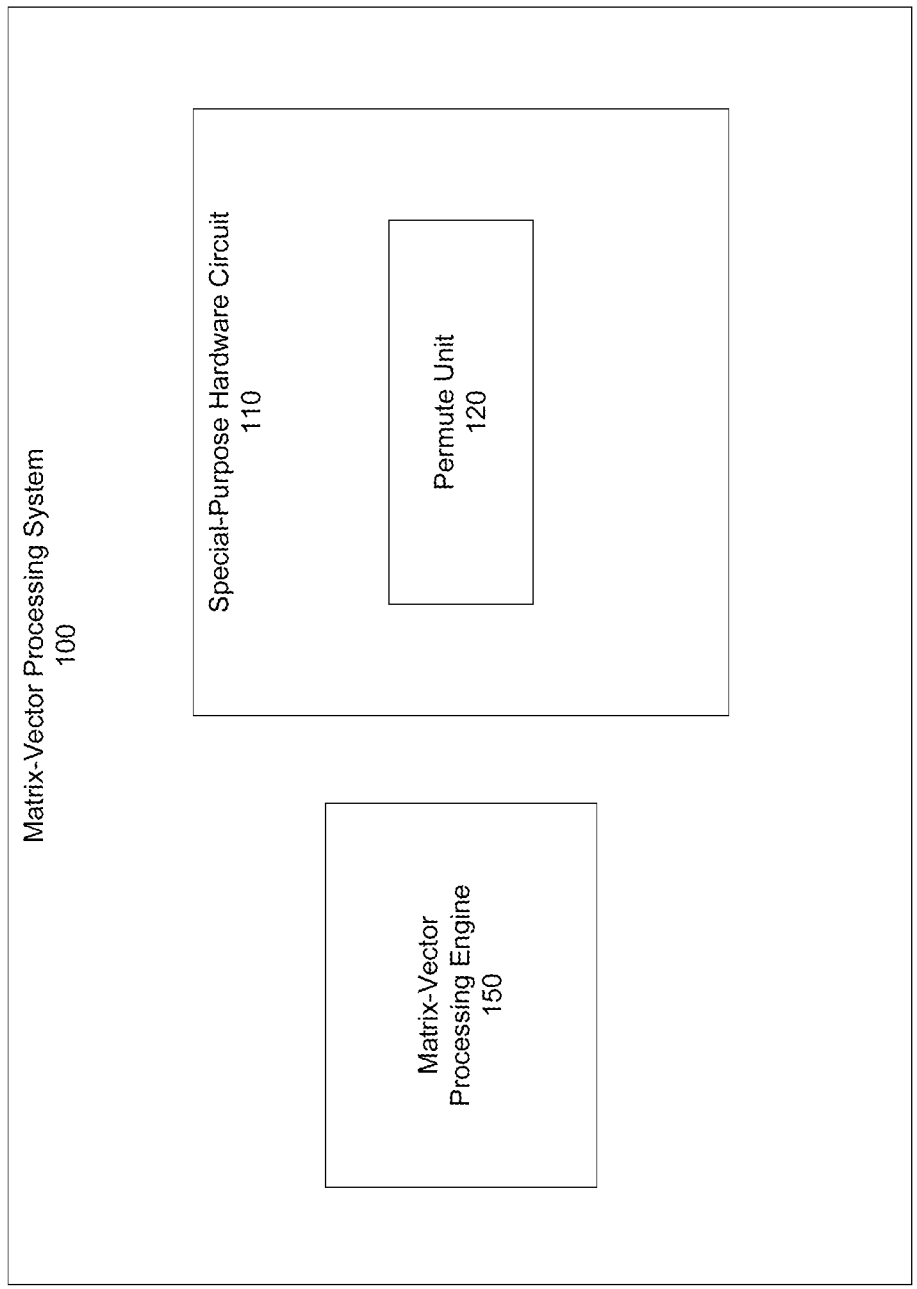
FIG. 1 shows an example matrix-vector processing system.

FIG. 1 shows an example matrix-vector processing system 100. The matrix-vector processing system 100 is an example of a system implemented as one or more computers in one or more locations in which the systems, components, and techniques described below can be implemented.

The matrix-vector processing system 100 is a system that performs matrix or vector computations using a special-purpose hardware circuit 110. The special-purpose hardware circuit 110 is an integrated circuit for performing matrix or vector computations that includes a permute unit 120 configured to compute matrix or vector permutations in hardware. An example special-purpose hardware circuit 110 is described in more detail with reference to FIG. 2.

The matrix-vector processing system 100 receives requests to perform matrix or vector computations on the special-purpose hardware circuit 110, controls the special-purpose hardware circuit 110 to perform the matrix or vector computations, and outputs results of the matrix or vector computations generated by the special-purpose hardware circuit 110. For example, the matrix-vector processing system 100 may receive a request to compute a permutation of an input matrix or vector, permute the input matrix or vector on the special-purpose hardware circuit 110, and output a resulting output matrix or vector in response to the request. The special-purpose hardware circuit 110 may be capable of performing additional computations in addition to matrix permutations. For example, the special-purpose hardware circuit 110 may also compute matrix convolutions, matrix arithmetic, matrix transposes, or other matrix computations, e.g., to process layers of a neural network. As such, the special-purpose hardware circuit 110 may permute a matrix as part of performing a larger computation using other components of the special-purpose hardware circuit 110.

To implement matrix or vector computations on the special-purpose hardware circuit 110, the matrix-vector processing system 100 includes a matrix-vector processing engine 150. The matrix-vector processing engine 150 may be implemented as one or more computer programs on one or more computers in one or more physical locations.

The matrix-vector processing engine 150 can generate instructions, provide control signals, or direct data to control the special-purpose hardware circuit 110 to perform matrix or vector computations in response to a request. For example, the matrix-vector processing system 100 may receive a request to perform a matrix or vector function, and the matrix-vector processing engine 150 can determine specific instructions or control signals for computing the function, or can determine how to direct data, e.g., corresponding to input matrices or vectors, for the computation.

Once the matrix-vector processing engine 150 determines how to implement computations corresponding to a matrix or vector computation request, the matrix-vector processing engine 150 controls the special-purpose hardware circuit 110 to perform the computations. For example, the matrix-vector processing engine 150 may direct data for performing the matrix or vector computations, such as input matrices or vectors, to the special-purpose hardware circuit 110. The matrix-vector processing engine 150 may also transmit instructions or control signals to the special-purpose hardware circuit 110 to control the special-purpose hardware circuit 110 to perform the appropriate computations on the data received by it from the matrix-vector processing engine 150.

For example, the matrix-vector processing system 100 can receive a request to compute a matrix or vector function. The requested function may be relatively simple, e.g., a request to perform simple linear algebra computations, or a more complex function, e.g., one for backpropagating gradients to train a neural network. The requested function may require computation of a matrix or vector permutation. The request may also identify or include one or more matrices or vectors for computing the function, i.e., one or more arguments to which the function is applied. The matrix-vector processing engine 150 can receive the request and can generate control signals or instructions to apply the function to the received matrix or vector arguments to the function. The matrix-vector processing engine 150 may furthermore direct the input matrices or vectors to the special-purpose hardware circuit 110.

For example, to compute a matrix or vector permutation, the matrix-vector processing engine 150 may provide the special-purpose hardware circuit 110 with a matrix or vector to permute, such as a matrix or vector input as an argument of a function or a matrix or vector generated as an output of a preceding computation. The matrix-vector processing engine 150 may also provide the special-purpose hardware circuit 110 with control signals for initiating the permute computation or parameters for performing the permutation on the permute unit 120. The permute unit 120 may receive the input matrix and the control signals provided to the special-purpose hardware circuit 110. The permute unit 120 can permute the matrix or vector in response to receiving the control signals, and can output a matrix or vector that is a permutation of the received matrix or vector. The matrix or vector output by the permute unit 120 may be used in other computations by the special-purpose hardware circuit 110 for computing the requested function. The special-purpose hardware circuit 110 may provide an output of the requested function, which the matrix-vector processing system 100 can return in response to the request.

Figure 2:
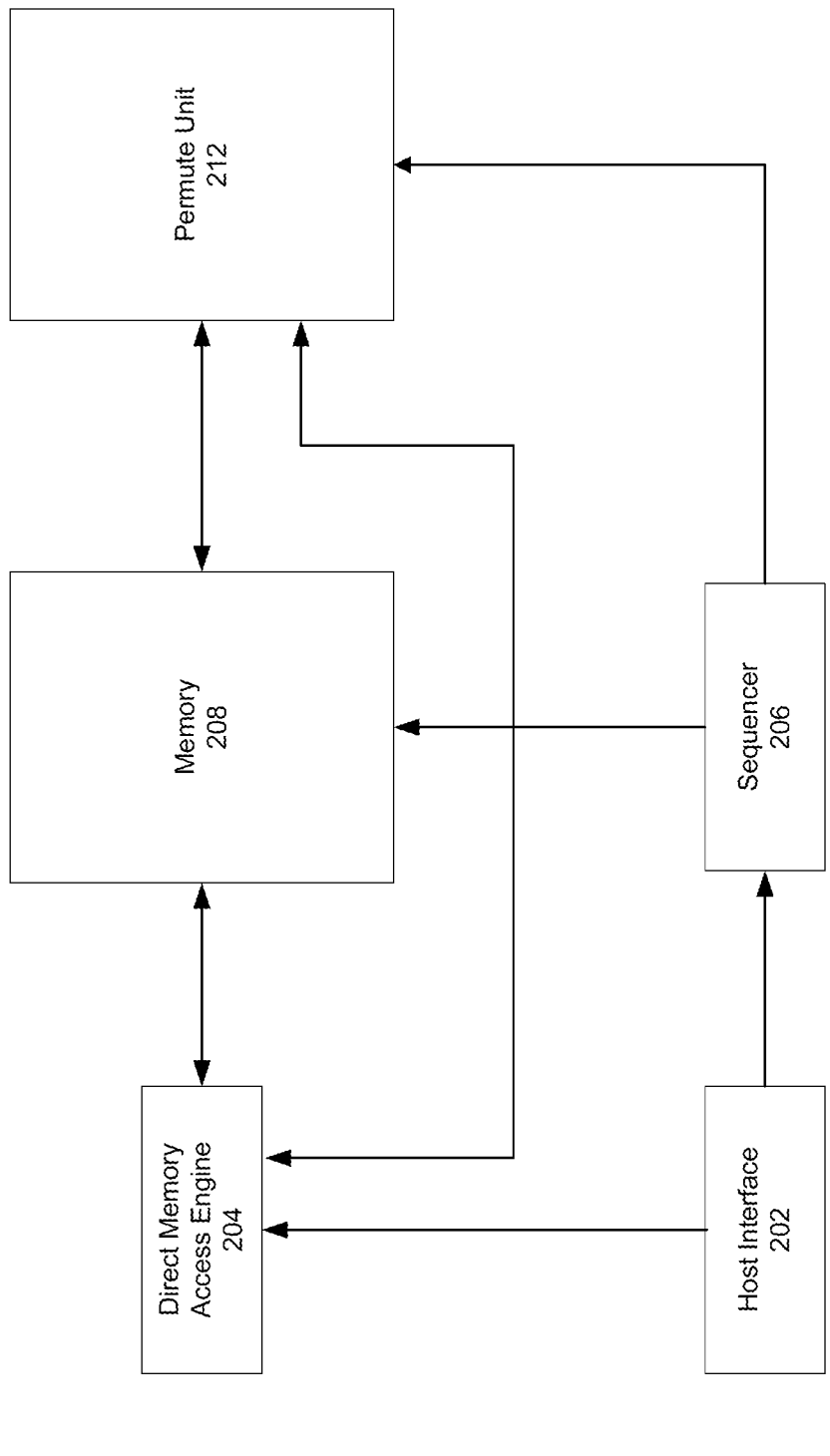
FIG. 2 shows an example matrix-vector processing system including a permute unit.

FIG. 2 shows an example special-purpose hardware circuit 200 for permuting matrices or vectors. In some implementations, the circuit 200 may include additional components, not shown, for performing other matrix or vector computations. Additional components for performing other matrix or vector computations may also utilize one or more of the components shown in FIG. 2.

The circuit 200 includes a host interface 202. The host interface 202 can receive control signals, instructions, or arguments for performing a matrix or vector permutation. The arguments can include, for example, a matrix to permute. Instructions or control signals received by the host interface 202 can include instructions indicating where to store the received arguments so that the circuit 200 may compute the matrix or vector permutation, may include parameters relating to the matrix or vector permutation, or may include other information, e.g., a memory location for storing an output of the matrix or vector permutation. A control signal received by the host interface may also initiate the matrix or vector permutation computation.

In some implementations, the host interface 202 can provide instructions to the sequencer 206, which converts the instructions into low-level control signals that control the circuit 200 to perform the permutation. For example, the control signals generated by the sequencer 206 may regulate dataflow in the circuit 200, e.g., where an input matrix should be stored or how that data should otherwise be directed through the circuit 200. The sequencer 206 may receive an instruction to initiate a matrix permutation on the circuit 200, and may generate a control signal for controlling a permute unit 212 to initiate the permutation computation.

The sequencer 206 can send the control signals to memory 208 and the permute unit 212. In some implementations, the sequencer 206 also sends control signals to a direct memory access engine 204. In some implementations, the sequencer 206 is a processor that generates control signals. The sequencer 206 can coordinate the control signals to send the control signals to the appropriate components of the circuit 200 at the appropriate times. In some instances, the sequencer 206 may receive control signals from the host interface 202 that are passed in externally from the circuit 200, e.g., from the vector-matrix processing engine 150 of FIG. 1, such that the sequencer 206 is not required to generate control signals. In such instances, the sequencer 206 may send the received control signals to the components of the circuit 200 at appropriate times. Moreover, where the circuit 200 is provided control signals, the sequencer 206 may be an optional component of the circuit 200, i.e., such that a component external to the circuit 200, e.g., the matrix-vector processing engine 150, may provide the control signals at the appropriate times to control the circuit 200 to perform a matrix permutation.

The host interface 202 can send an argument, e.g., an input matrix or vector, to the direct memory access engine 204. The direct memory access engine 204 can store the argument at the memory 208.

The memory 208 may be a memory buffer, e.g., a unified buffer, or may be a dynamic memory, e.g., a static random-access memory (SRAM). The memory 208 may be located on or off of the circuit 200. It can store an argument, e.g., a matrix, input to the circuit 200, or parameters for performing a matrix permutation. The memory 208 may also store outputs of the permute unit 212, i.e., a permutation of an input matrix or vector. The direct memory access engine 204 may, in some implementations, read from the memory 208. For example, the direct memory access engine 204 may read from the memory 208 to return, from the circuit 200, a result of performing a matrix or vector permutation.

The permute unit 212 can access an argument at the memory 208. For example, after the direct memory access engine 204 stores an input matrix in the memory 208, the input matrix may be provided or made accessible to the permute unit 212, so that the permute unit 212 may compute a permutation of the input matrix.

The permute unit 212 is a circuit for computing matrix or vector permutations. In some implementations, the permute unit 212 is designed such that it may be triggered to compute a permutation based on receiving an argument and information specifying the permutation, i.e., how the rows or columns of the matrix or vector are to be rearranged. After receiving this information, the permute unit 212 may perform a permutation without receiving additional control signals or inputs, such that the permutation computation is otherwise automated in the permute unit 212 once it has received the necessary inputs, i.e., the input matrix or vector and the permutation parameters. In such an implementation, once a permutation has been initiated, the permute unit 212 may perform an entire permutation based on the received information and without requiring additional instructions from off-chip.

Generally, to compute a matrix permutation, the permute unit 212 first flattens data read in a staggered memory read of an argument stored in the memory 208. When the argument is a matrix, the staggered memory read enables the permute unit 212 to obtain a vector of the matrix, e.g., a first row or column of the matrix, depending upon whether the matrix is stored in row-major order or column-major order. The permute unit 212 also receives or accesses control signals that specify, for each element of the vector of the matrix, a permutation of the element of the vector. For example, the permute unit 212 may receive or access a vector of control signals that is composed of elements each specifying a number of positions to rotate a corresponding element of the vector of the input matrix, or that are each a pointer to where the element of the vector of the input matrix is to be stored. The control signals can control a set of multiplexors included in the permute unit 212 or a memory crossbar circuit of the permute unit 212 to permute the elements of the vector of the input matrix according to the control signals. The permuted vector of elements of the input matrix can be re-staggered and output, e.g., to the memory 208 or to another component of the circuit 200. The process can be repeated for each vector of the matrix until a full permutation of the input matrix is computed.

Similar operations are performed when the argument is a vector. Thus, when the argument is a vector, flattening the staggered memory read provides the input vector, which can then be permuted according to a set of control signals accessed or received by the permute unit 212. The vector permutation can be re-staggered on output and stored, e.g., in the memory 208, or provided to another component of the circuit 200.

Figure 3:
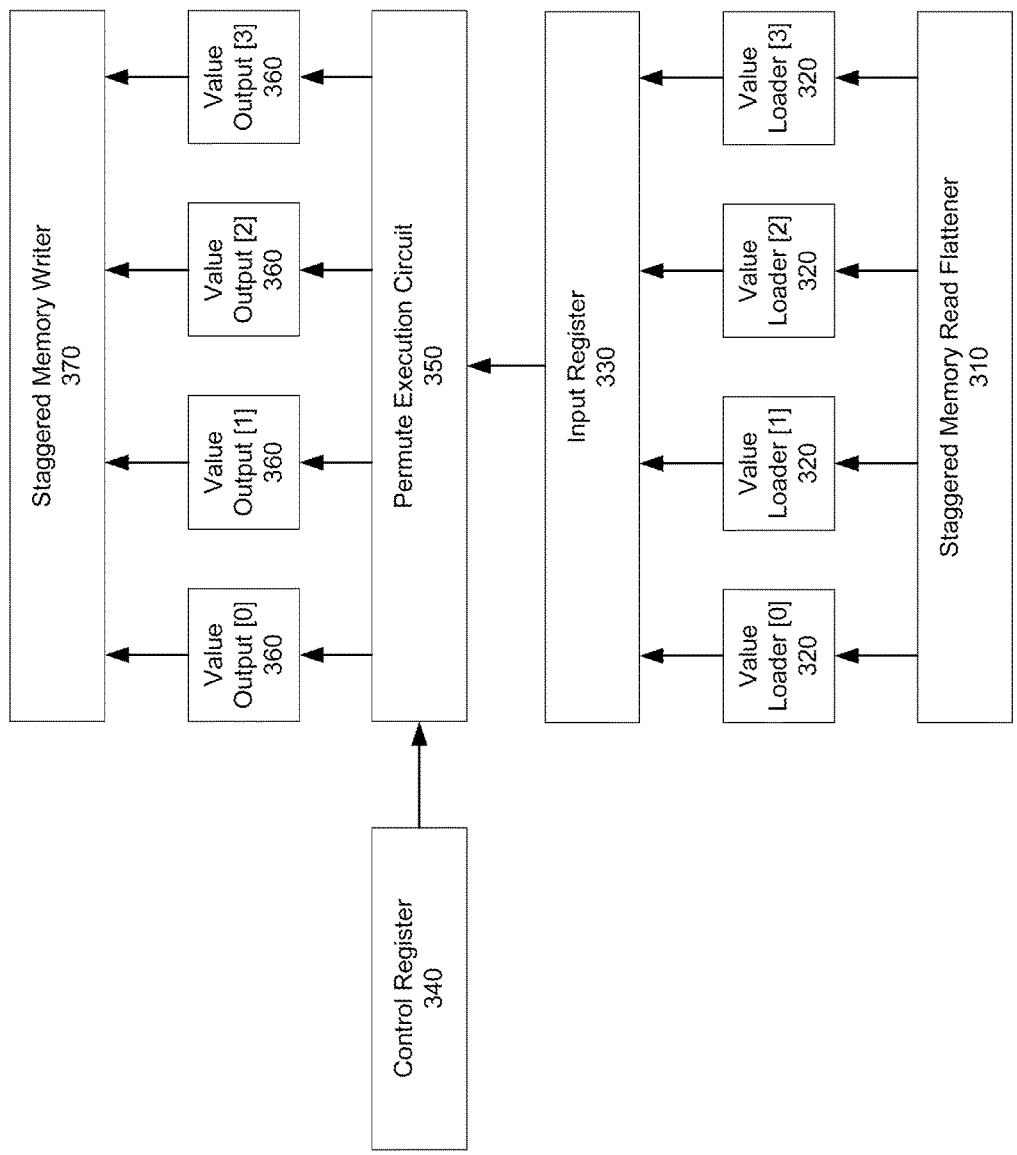
FIG. 3 shows an example architecture of a permute unit in a matrix-vector processing system.

FIG. 3 shows an example architecture of a permute unit 300. A staggered memory read flattener 310 of the permute unit 300 performs a staggered read of data corresponding to an input matrix or vector, flattens the data, and outputs a flattened vector corresponding to a vector of the input matrix or vector. As used in this specification, staggered data is data transmitted in multiple lanes with an offset, such that a data stream in each lane is some multiple of cycles behind a data stream in another lane, e.g., a data stream in a first lane is one cycle ahead of a data stream in a second lane. Flattening staggered data refers to aligning the data streams or the data from those data streams. For example, flattening may be performed to align a first element in a first data stream in a first lane with a first element in a second data stream in a second lane, where the first and second data streams in the first and second lanes are staggered.

Generally, other components of the special-purpose hardware circuit 200 may be able to perform computations more efficiently on staggered data, by performing certain operations in parallel. For example, units for performing matrix transposes or matrix convolutions may operate on staggered data, because staggered data reads may enable the units to perform certain operations in parallel when computing matrix transposes or convolutions. Because the permute unit 300 operates on flattened data, the permute unit 300 must flatten input data to perform a permutation, and must re-stagger output data to allow other components of the special-purpose hardware circuit 200 to perform operations on a permuted matrix output by the permute unit 300.

The staggered memory read flattener 310 may be a circuit, for example, including a first-in-first-out register, that is controlled by control signals received by the permute unit 300, e.g., from the sequencer 206 or matrix-vector processing engine 150. To flatten staggered data, the staggered memory read flattener 310 can receive staggered data corresponding to an input matrix or vector, and can flatten the data until the staggered memory read flattener 310 has received the entire input vector or an entire vector of the input matrix. For example, the staggered memory read flattener 310 can store the elements of the input matrix in the first-in-first-out register. When the staggered memory read flattener 310 determines that it has received the entire input vector or an entire vector from an input matrix, the staggered memory read flattener 310 can pop all of the elements of the register. In some implementations, the staggered memory read flattener 310 determines that an entire input vector or entire vector from an input matrix has been received when valid data is received at a highest-order bit of the first-infirst-out register. In some instances, the staggered memory read flattener 310 may receive information indicating a size of the input vector or matrix, and may pop the data stored in the first-in-first-out register once valid data has been received in a bit corresponding to the size of the input vector or matrix.

When the staggered memory read flattener 310 pops the data corresponding to a vector of elements from an input matrix, or an entire vector input, the elements of the vector are transmitted to value loaders 320. In practice, each value loader 320 corresponds to a different lane of the data, e.g., a different column or row of the input matrix, accessed by the staggered memory read flattener 310. In the example permute unit 300 shown in FIG. 3, the architecture is configured to permute matrices up to 4×4. However, this same technique may be expanded to any size permute unit, e.g., a permute unit for permuting 128×128 or larger matrices. Thus, for the architecture shown in FIG. 3, each value loader 320 corresponds to column of the input matrix. If permuting a matrix having fewer than 4 columns, the staggered memory read flattener 310 may pop data to the value loaders 320 once a vector of the size of the input matrix has been received and flattened by the staggered memory read flattener 310. Additionally, any data transmitted to the value loaders 320 that do not correspond to a particular column of the input matrix may be ignored or discarded. For example, if a 3×3 input matrix is read by the staggered memory read flattener 310, values received by value loader [3] can be ignored or discarded, as they do not correspond to elements of the input matrix.

The value loaders 320 transmit the received elements to the input register 330, where the input register stores the elements as an input vector. For the example permute unit 300 shown at FIG. 3, the input register 330 may be a 1×4 register of elements, corresponding to the dimensions of the maximum-sized input matrix that the permute unit 300 can process. Thus, an element received by value loader [0] may be stored in a (0,0) element of the input register 330, an element received by value loader [1] may be stored in a (0,1) element of the input register 330, and so forth. Because the data provided to the value loaders 320 and then to the input register 330 is flattened, all of the elements of the vector of the input matrix may be stored in the input register 330 at approximately the same time. Thus, once a vector, e.g., a first row, of an input matrix has been received by the staggered memory read flattener 310, that vector of the input matrix may be rapidly popped to the input register 330 via the value loaders 320. In instances where the matrix or vector input to the permute unit 300 is smaller than the maximum input size for the permute unit 300, the value loaders 320 may not send the values that do not correspond to elements of the input matrix or vector to the input register 330. For example, if a 3×3 matrix is input to the 4×4 permute unit 300, value loader [3] may not send data to the input register 330.

A control register 340 of the permute unit 300 receives data for controlling a permute execution circuit 350 to perform a permutation of the vector received by the input register 330. For example, the control register 340 may receive control signals in the form of a vector of elements from the memory 208 of FIG. 2, from the matrix-vector processing engine 150 of FIG. 1, or from another component of the system. The control signals may be received as a vector at the control register 340 and stored at the control register 340. In some instances, the elements stored at the control register 340 may indicate a number of rotations by which to rotate, i.e., shift in a particular direction, a corresponding element of the vector stored at the input register 330. In other implementations, the elements stored at the control register 340 may be pointers to elements in memory that correspond to the requested permutation of the vector stored at the input register 330. In still other implementations, the elements stored at the control register 340 may indicate a position where a particular element of the input vector should be stored in an output vector, or positions where elements in particular positions of the input vector should be included in the output vector.

For example, a request to perform a computation that includes a matrix permutation may also specify, or the matrix-vector processing system 100 may determine, parameters of the matrix permutation. The parameters of the matrix permutation may include, for instance, whether the permutation should be a row or column permutation, and the reordering of the rows or columns of the matrix. In some implementations, the control signals for a particular permutation, which are limited in their combinations, may be predetermined, e.g., by the matrix-vector processing engine 150, and stored, e.g., at the memory 208. Thus, providing a vector of elements to the control register 340 may require only that the permute unit 300 receive or access the particular predetermined set of control signals, i.e., a predetermined vector of pointers or data indicating a number of rotations, to perform the appropriate permutation.

In some implementations, the appropriate vector of elements may be provided to the control register 340 by the matrix-vector processing engine 150 of FIG. 1, may be selected by the sequencer 206 of FIG. 2 and provided to the control register 340 from the memory 208, or may otherwise be selected and provided to the control register 340. In other implementations, the permute unit 300 may receive data indicating parameters of the permutation, and may generate control signals to store at the control register 340 for controlling the permutation. That is, a component of the permute unit 300 may receive the parameters of the permutation, e.g., a permutation matrix, data indicating whether the permutation is a row or column permutation, or other data, and may generate a vector of control signals to store at the control register 340 to perform the permutation.

The permute execution circuit 350 can receive or access the vector stored at the input register 330, and can permute the vector based on the control signals stored at the control register 340. The permute execution circuit 350 can then output the permutation of the vector stored at the input register 330 to the value outputs 360. The permute execution circuit 350 can output the vector to the value output 360 in an un-staggered fashion, i.e., by providing the elements of the output vector to the value outputs 360 simultaneously or nearly simultaneously.

In some examples, the permute execution circuit 350 includes a series of multiplexors. The number of multiplexors included in the permute execution circuit 350 may correspond to the number of elements of the input register 330. For example, the permute unit 300 of FIG. 3 that is capable of permuting a 4×4 input matrix may have four multiplexors. Each multiplexor may be an n-to-one multiplexor, where n is the dimension of the input matrix that the permute unit 300 can process. For the permute matrix 300, therefore, each multiplexor may be a 4-to-1 multiplexor. The inputs of each n-to-one multiplexor may be connected to the elements of the input register 330, such that each multiplexor has access to all of the elements of the input register 330. The output of each n-to-one multiplexor may be connected to a distinct value output 360, such that each multiplexor sends a single element to each value output 360.

The outputs of the multiplexors can be stored as an output vector that is a permutation of the input vector.

Figure 4:
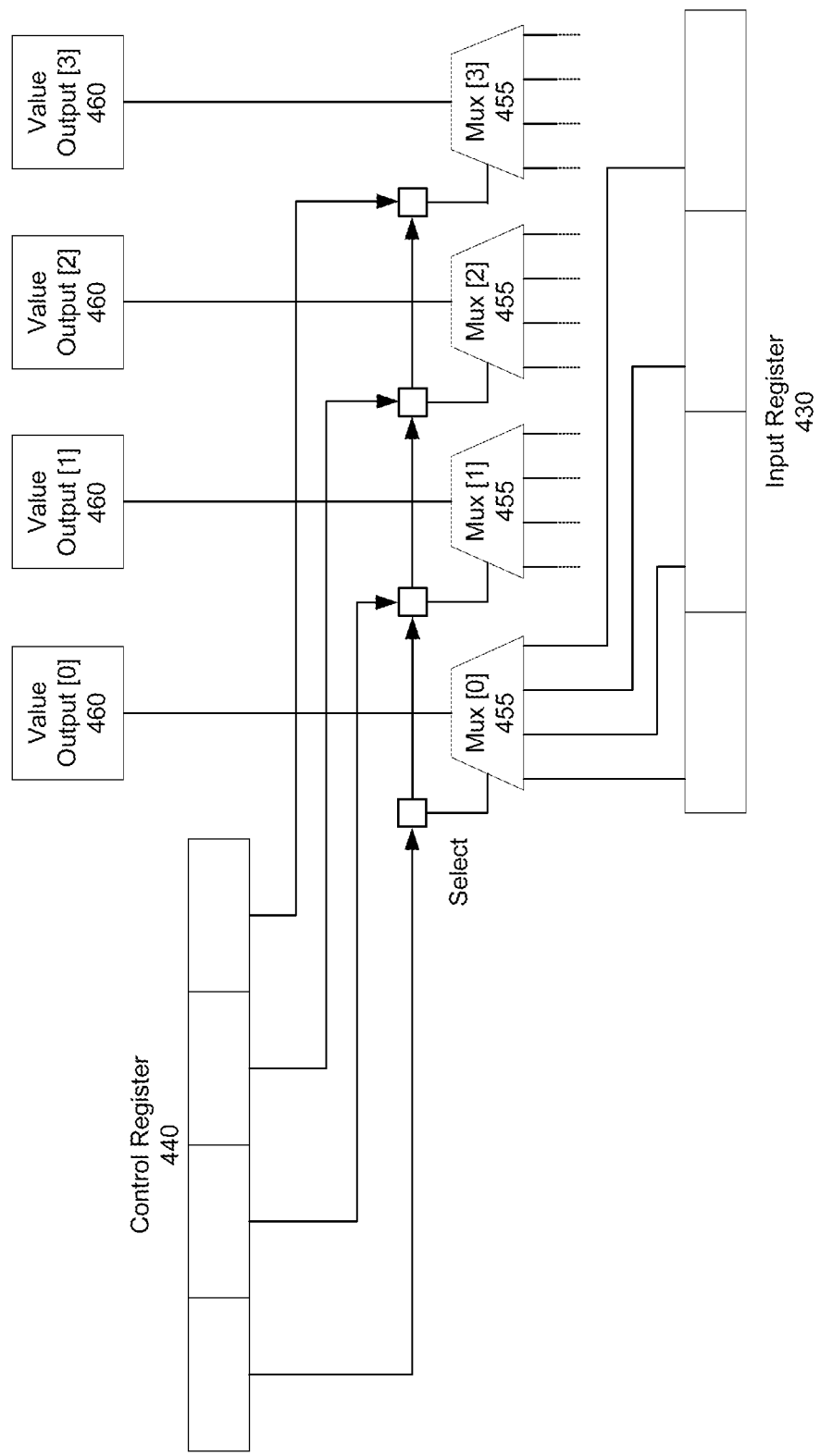
FIG. 4 shows an example architecture of a permute execution circuit in a permute unit of a matrix-vector processing system.

The elements stored at the control register 340 are used in controlling the outputs of the multiplexors of the permute execution circuit 350, as described in more detail with respect to FIG. 4. For example, each element of the control register 340 may act as a select signal for a corresponding multiplexor of the permute execution circuit 350. Thus, the control signal may specify a number of element positions to rotate an element that is to be output at a particular multiplexor. Alternatively, the control signal for a particular multiplexor may simply specify an input, corresponding to a particular element of the input register 330, to output at the output of the multiplexor.

In other implementations, the multiplexors may be one-to-n multiplexors. In such an example, each multiplexor may receive an element from a corresponding value loader 320, and may output the element at an output of the multiplexor specified by a corresponding control signal from a corresponding position of the control register 340. For example, a first element in the control register 340, i.e., an element in the (0,0) position of the vector stored in the control register 340, may operate as a select signal for a multiplexor of the permute execution circuit 350 that receives an element of the vector of the input matrix from value loader [0]. The select signal may indicate at which of the n outputs the one-to-n multiplexor should provide the data received from the value loader [0]. For example, the element in the (0,0) position of the control register 340 may indicate a number of positions to rotate the data received from value loader [0], and the output of the one-to-n multiplexor at which to provide the data received from value loader [0] may be selected to effect rotation of the data by the specified number of positions.

In other implementations, the permute execution circuit 350 includes a crossbar, e.g., a universal full crossbar that is composed of, essentially, a matrix of switches that enables n inputs to be provided to any of n outputs. For the example permute unit 300 of FIG. 3, the crossbar would include a 4×4 matrix of switches that enables any particular input of the crossbar to be output at any particular output of the cross bar. When the permute execution circuit 350 includes a crossbar, the control signals stored at the control register 340 are signals for controlling the switches of the crossbar. For example, an element stored at the (0,0) position of the control register 340 may be interpreted by the permute execution circuit 350 to control how an element provided to a first input of the crossbar should be directed, i.e., to a particular output of the crossbar, using switches of the crossbar. Thus, each control signal may specify a particular output position to which an element at a particular input position should be transmitted, may specify a number of positions by which to rotate an element at a particular input position of the crossbar, or may otherwise specify how to permute the data inputs to the crossbar.

Other components may be included in the permute execution circuit 350 to enable the permute execution circuit 350 to permute the vector of elements accessed by the permute execution circuit 350 at the input register 330. For example, the permute execution circuit 350 may include elements that are capable of writing inputs directly to memory, such that each element stored at the control register 340 may be a pointer that indicates where in memory to write a corresponding element of the vector stored at the input register 330. For instance, an element of the permute execution circuit 350 may receive an element of a vector of the input matrix from the value loader [0], and may write the element to a memory location specified by a pointer stored at the (0,0) position of the control register 340.

Because each output of the permute execution circuit 350 may be data corresponding to any of the elements of the input vector, in some implementations elements of the input vector may not be included in an output vector, i.e., may not be selected as an output of the permute execution circuit 350. Similarly, there may be elements of an input vector that the permute execution circuit 350 may select, based on the elements in the control register 340, to output to multiple positions of an output vector. While not be commonly employed in matrix permutation computations, this functionality may enable other desirable matrix manipulations.

The permute execution circuit 350 may store the permuted vector at a register of the permute execution circuit 350. If stored at a register of the permute execution circuit 350, the elements may be accessed by value outputs 360, which then provide the elements to the staggered memory writer 370 for writing into memory, e.g., into the memory 208. For instance, after writing rotated elements into the register of the permute execution circuit 350, each of the value outputs 360 may access a corresponding element of the register of the permute execution circuit 350. For example, the value output [0] 360 may access an element in the [0] position of the register of the permute execution circuit 350, the value output [1] 360 may access an element in the [1] position of the register of the permute execution circuit 350, and so forth. Alternatively, if the permute execution circuit 350 sends the elements of the permuted vector of the input matrix to the value outputs 360 without storing the elements in a register, the value outputs 360 can receive the elements from the permute execution circuit 350 and output the vector of elements to the staggered memory writer 370.

The staggered memory writer 370 receives the elements from the value outputs 360 and appropriately writes the elements into memory such that the memory stores an output vector that is a permutation of the vector of elements of the input matrix. The permuted vector of elements of the input matrix that is stored in the memory may be, for instance, a permuted row or column of the input matrix. Using similar techniques as those described previously for the staggered memory read flattener 310, the staggered memory writer 370 can store the elements in the memory 208 such that the vector corresponding to a vector of the permutation of the input matrix is properly formatted. For instance, the staggered memory writer 370 may receive the vector of outputs from the value outputs 360, and may delay writing the elements to output lanes to achieve a staggered output. After the permute unit 300 has processed all of the vectors of the input matrix, the permutation of the input matrix will have been properly stored in memory in an appropriate format. The permutation of the input matrix may be returned as the result of a function computed by the special-purpose hardware circuit 200 that includes the permute unit, or the permutation of the input matrix can be further processed within the special-purpose hardware circuit 200 to generate a result that can then be returned by the matrix-vector processing system 100 in response to a request.

In other implementations, the staggered memory writer 370 can provide the elements of the permutation to other components of the special-purpose hardware circuit 200 for processing by those components. In many instances, components of the special-purpose hardware circuit 200, such as a component that performs matrix convolutions, operate on staggered matrix input data. Therefore, the permute unit 300 can provide the permutation of the input matrix to those components in a staggered fashion to increase the efficiency of matrix processing within the special-purpose hardware circuit 200.

In some implementations, the number of elements that can be received by the input register 330, the control register 340, and the permute execution circuit 350 may be the same, i.e., the input register 330, control register 340 and permute execution circuit 350 may all have the same width. In other implementations, one or more of the input register 330, control register 340, or permute execution circuit 350 may be capable of receiving a different number of elements and of storing these elements as a vector, e.g., in a register, or performing computations, e.g., permutations, on these elements. In some implementations, the value loaders 320 and/or the value outputs 360 may be optional components of the permute unit 300. For example, the staggered memory read flattener 310 may write data directly to the input register 330, or the permute execution circuit 350 may transmit data directly to the staggered memory writer 370.

In some implementations, the permute unit 300 may be capable of performing one or both of row permutations or column permutations. For example, the input register 330 may be configured to receive a column of elements of an input matrix. Using control signals from the control register 340, the permute execution circuit 350 can permute the elements of the column of the input matrix to generate an output vector having the elements rearranged as specified by permutation parameters. The permute execution circuit 350 can repeat this process for each column of the input matrix to generate a permutation of the input matrix in which the rows of the matrix are rearranged.

FIG. 4 shows an example architecture of a permute execution circuit 400. The permute execution circuit 400 receives or accesses vectors of elements of an input matrix at the input register 430. As shown in FIG. 4, the input register 430 includes four addresses, i.e., has a width of four, each for storing an element of an input matrix. The control register 440 also includes four addresses, i.e., has a width of four, each for storing an element corresponding to a control signal for controlling a permutation of a particular element of the vector of the input matrix.

The permute execution circuit 400 shown in FIG. 4 also includes four multiplexors (MUX) 455 that are each a 4-to-1 multiplexor corresponding to the width of the input register 430. Each input of each multiplexor 455 is attached to a different one of the four elements of the input register 430. For example, each of the inputs of multiplexor [0] shown in FIG. 4 is connected to a different element of the input register 430, such that multiplexor [0] has access to all of the elements stored at the input register 430. While not shown in FIG. 4 for ease of representation, each of the other multiplexors [1] through [3] also has each of its four inputs connected to a different one of the four elements of the input register 430. Each output of the multiplexors 455 is connected to a corresponding value output 460. The outputs of the multiplexors 455 sent to the value outputs 460 can be stored as a vector corresponding to a permutation of a vector of an input matrix. Using such an architecture, the four multiplexors 455 of the permute execution circuit 400 together form an all-to-all multiplexor.

To control the permute execution circuit 400 to permute vectors of an input matrix received at the input register 430, control signals are stored at the control register 440 and provided to the multiplexors 455 as select signals. For example, the control register 440 may receive and store a vector of control signals received from a component on-chip, e.g., from the memory 208 of the special-purpose hardware circuit 200, or may receive and store a vector of control signals received from a component off-chip, e.g., from the matrix-vector processing engine 150 of the matrix vector processing system 100 of FIG. 1.

In some implementations, vectors of control signals for different matrix permutations are predetermined, and appropriate vectors are provided to the control register 440 based on parameters of a particular permutation operation. For instance, the matrix-vector processing system 100 may store vectors corresponding to the various matrix permutations that are possible for various sized matrices. As an example, a 3×3 matrix may be permuted using one of six possible permutation matrices, and so vectors for permuting rows or columns of a 3×3 input matrix may be predetermined and stored, e.g., at a memory of the matrix-vector processing system 100. When a request to permute a 3×3 matrix is received, the system may select the appropriate vector of control signals for the requested permutation, and may provide the appropriate vector of control signals to the control register 440. In other implementations, the matrix-vector processing engine 150 may receive a request to perform a computation that includes a matrix permutation, and based on the request, may generate one or more vectors of control signals that the matrix-vector processing engine 150 can provide to the special-purpose hardware circuit 110 for storage at the control register 440.

Similarly, in other implementations, the sequencer 206 or another component of the special-purpose hardware circuit 200 may generate or access vectors of control signals to store at the control register 440. For example, the sequencer 206 may receive instructions to implement a particular matrix permutation, e.g., from the matrix-vector processing engine 150, and in response may identify and access particular vectors of control signals to provide to the control register 440. The sequencer 206 may access the vectors of control vectors, for example, at the memory 208 of the special-purpose hardware circuit 208. In some examples, the sequencer 206 may be capable of providing control signals to the control register 440 directly, e.g., such that the sequencer 206 can determine the control signals to store at the control register 440 based on instructions received from the matrix-vector processing engine 150 and can provide those control signals for storage at the control register 440.

Each of the control signals stored as elements of the control register 440 are provided as a select signal to a particular multiplexor 455. For example, as shown in FIG. 4, the element stored at the (0,0) position of the control register 440 is provided as a select signal to multiplexor [0], the element stored at the (0,1) position of the control register 440 is provided as a select signal to multiplexor [1], and so forth. The select signals may also be connected to one another as shown in FIG. 4 to enable propagation of a select signal to each multiplexor 455 in turn. For example, the element stored at the (0,0) position of the control register 440 may be provided to multiplexor [0] at a first cycle, e.g., when permuting a first vector of an input matrix, and may be propagated to be the select signal for multiplexor [1] at a second cycle, e.g., when permuting a second vector of an input matrix.

In the example implementation of the FIG. 4, each element stored at the control register 440 may specify an input of a corresponding multiplexor 455 that is to be output at the output of the multiplexor 455. In other implementations, the elements of the control register 440 may specify pointers to memory locations corresponding to elements of the input register 430 to access and output from a particular multiplexor 455. For example, a first element of the control register 440 may include a pointer to a memory address of the input register 430 that multiplexor [0] should access and output to value output [0]. In other implementations, the elements of the control register 440 may indicate a number of positions to rotate the data in the input vector 430. For example, if multiplexor [0] is to output the element stored at element (0,2) of the input register 430, corresponding to a two-position rotation of a vector of an input matrix, a first element of the control register 440 may specify rotation information that multiplexor [0] may interpret to determine an input of the multiplexor [0] to provide at its output.

Each of the multiplexors 455 accesses data at the input register 430 according to the elements stored at the control register 440, and outputs the data to the value outputs 460 as a permutation of the vector of the input matrix. For example, each multiplexor 455 receives an element from the control register 440 to interpret as a select signal, accesses elements of the input register 430 according to the select signals, and outputs the accessed elements to the value outputs 460. The elements output to the value loaders 460 may be stored in memory, e.g., the memory 208, as a vector of a permutation of the input matrix.

In some implementations, the multiplexors 455 may each access the elements of the control register 440 at the same time, such that the multiplexors 455 may also access elements of the input register 430 at the same time and output the accessed elements of the input register 430 to the value loaders 460 at the same time. Thus, a full permutation of a vector of an input matrix may be performed in a minimum amount of time, thereby improving the efficiency of the permute execution circuit 400 in performing matrix permutations.

Figure 5:
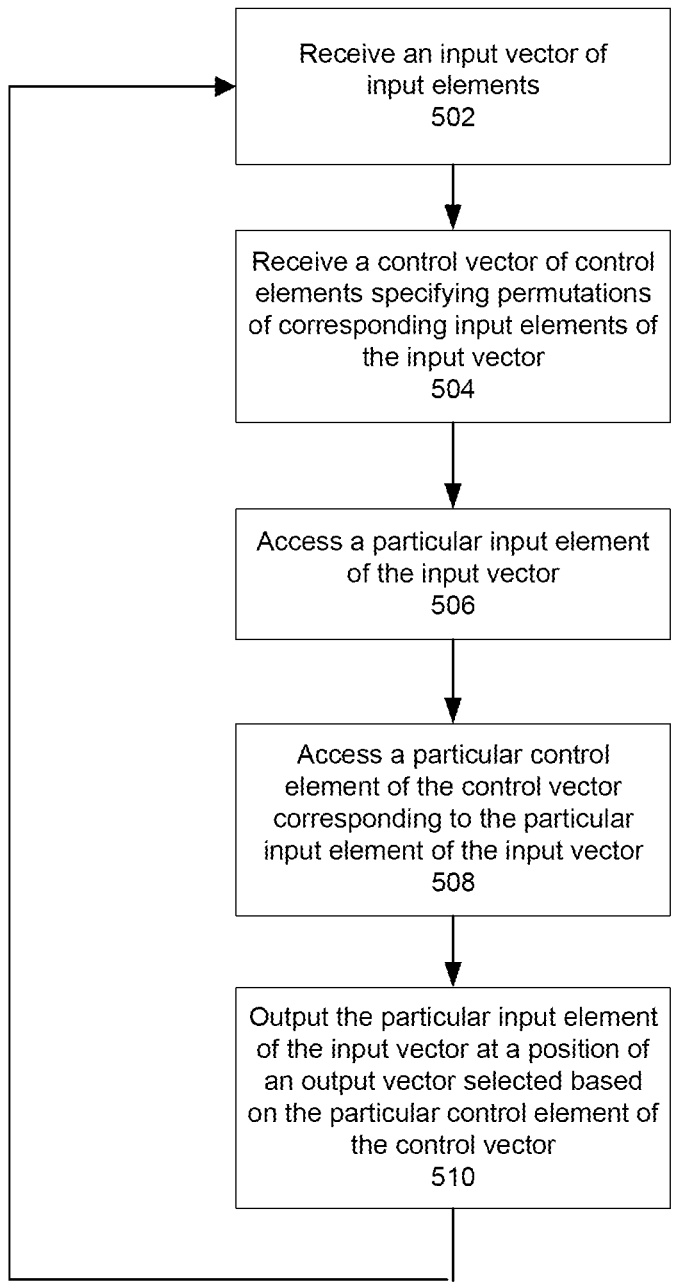
FIG. 5 is a flow diagram of an example method for permuting a matrix using a matrix-vector processing system.

FIG. 5 is a flowchart of an example process 500 for permuting an input vector. In some examples, the input vector is a vector of an input matrix, where a permutation of the input vector may be computed as part of generating a permutation of the input matrix. Generally, the process 500 is performed by a system of one or more computers that includes a special-purpose hardware circuit, for example, the special-purpose hardware circuit 110 of FIG. 1 that includes the permute unit 120.

The system receives an input vector of input elements (502). For example, an input register of the system may be configured to receive a vector of elements corresponding to a vector of an input matrix. The vector of elements of the input matrix may be received in a staggered fashion, and the vector of elements flattened, i.e., un-staggered, before the vector of elements is received in the input register. For example, the staggered memory read flattener 310 of FIG. 3 may receive staggered data, in which data corresponding to a vector of the input matrix is received across multiple lanes in a delayed fashion. The staggered memory read flattener 310 may write the input vector of elements that corresponds to the vector of the input matrix to the input register 330, e.g., via the value loaders 320, as flattened data, e.g., by writing all elements of the input vector of elements to the input register 330 simultaneously or nearly simultaneously.

The system receives a control vector of control elements, wherein each control element of the control vector corresponds to a respective input element of the input vector, and wherein each control element specifies a permutation of a corresponding input element of the input vector (504). For example, a control register of the system may be configured to receive a control vector of elements specifying permutations of the elements received at the input register of the system. The elements of the control vector may be control signals for controlling the permutations of the input vector elements performed by the system. In some implementations, the system may determine a control vector based on a received request to perform a matrix permutation, or may access a predetermined and stored control vector based on the received request to perform the matrix permutation. For example, the matrix-vector processing engine 150 of FIG. 1 or the sequencer 206 of FIG. 2 may generate a control vector based on parameters of the requested matrix permutation, may access a control vector based on the parameters of the requested matrix permutation, or may otherwise generate control signals for storing the control vector at the control register. The matrix-vector processing engine 150 or sequencer 206 may provide data to the control register as the control vector, and the control register may store the received data as the control vector.

To generate an element of an output vector of output elements corresponding to a permutation of the input vector, the system performs a series of operations (506-510). For example, a permute execution circuit of the system may be configured to generate an output vector of output elements corresponding to a permutation of the input vector. To generate the output vector, the permute execution circuit may perform the series of operations (506-510) on each input element of the input vector stored at the input register. The operations (506-510) may be performed simultaneously, i.e., such that the permute execution circuit performs the operations on all of the elements of the input vector at once. Accessing and permuting the elements of the input vector at once, instead of separately, enables the permute execution circuit to efficiently compute a permutation of the input vector.

The system accesses a particular input element of the input vector (506). For example, the permute execution circuit may access a particular element of the input vector at the input register. In some implementations, as discussed above, the permute execution circuit accesses all of the elements of the input vector stored at the input register.

The system accesses a particular control element of the control vector corresponding to the particular input element of the input vector (508). For example, the permute execution circuit of the system may access, at the control register, a particular control element of the control vector that is in a position of the control register that corresponds to a position of an accessed input element of the input vector. Just as the permute execution circuit may access all elements of the input vector at once to perform permutation operations on all of the elements of the input vector simultaneously or nearly simultaneously, instead of sequentially, the permute execution circuit may also access all of the elements of the control vector stored at the control vector at once.

The system outputs the particular input element of the input vector as an output element at a particular position of the output vector that is selected based on the particular control element of the control vector (510). For example, the permute execution circuit may output each input element of the input vector stored at the input register as an output element at a particular position of the output vector that is determined based on the corresponding control element of the control vector stored in the control register. The system may output all of the elements of the output vector at once, i.e., may permute each of the elements of the input vector as specified by the corresponding element of the control vector simultaneously.

For example, the permute execution circuit may include multiple multiplexors or a crossbar for permuting the elements of the input matrix according to the control vector. The elements of the control vector may each indicate a particular element position of the input vector to output at a particular element position of the output vector. In other instances, the elements of the control vector may each be a pointer to an address of the input vector, such that the permute execution circuit outputs the data stored at the identified address at a corresponding position of the output vector. Alternatively, the elements of the control vector may each be a pointer to an address of a particular element position of the output vector, e.g., in memory or in an output register, to write a particular element of the input vector. In still other implementations, the elements of the control vector may each indicate a number of positions to rotate, i.e., shift, elements of the input vector to generate an output vector that corresponds to the input vector. Where the permute execution circuit includes multiplexors, the elements of the control vector can operate as select signals to control the inputs or outputs of the multiplexors, or can be used to otherwise control the inputs or outputs of the multiplexors. Where the permute execution circuit includes a crossbar circuit, the elements of the control vector can operate or can otherwise be used to control the switches of the crossbar to output elements of the input vector at appropriate element positions in the output vector.

The process 500 may be repeated for each of the vectors, i.e., rows or columns, of an input matrix. For example, for column permutations of an m×n input matrix, n iterations of the process 500 are performed by the system to generate a permutation of the m×n input matrix.

Figure 6A:
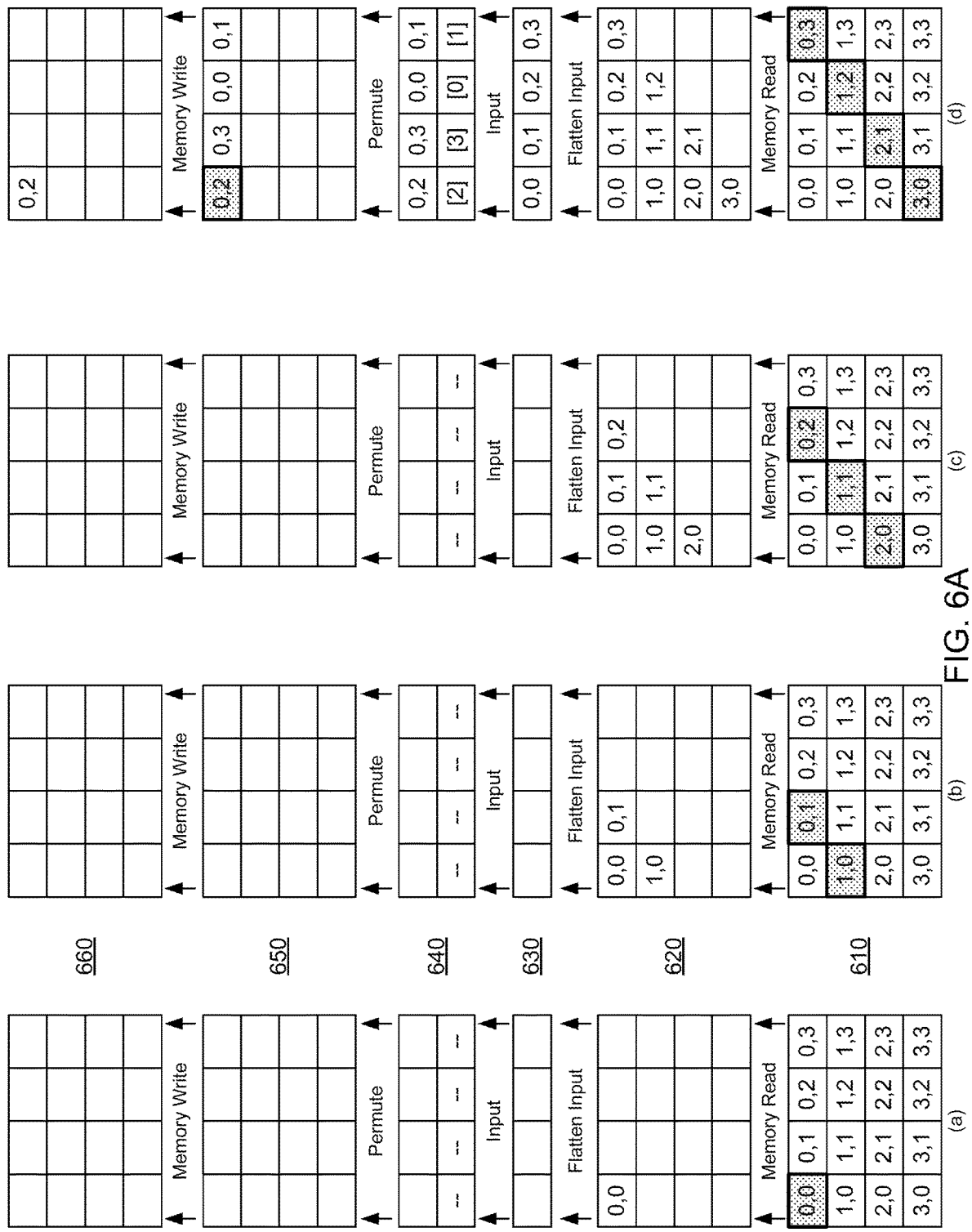
FIGS. 6A-6C show an example of a matrix permutation performed in a matrix-vector processor.
Figure 6B:
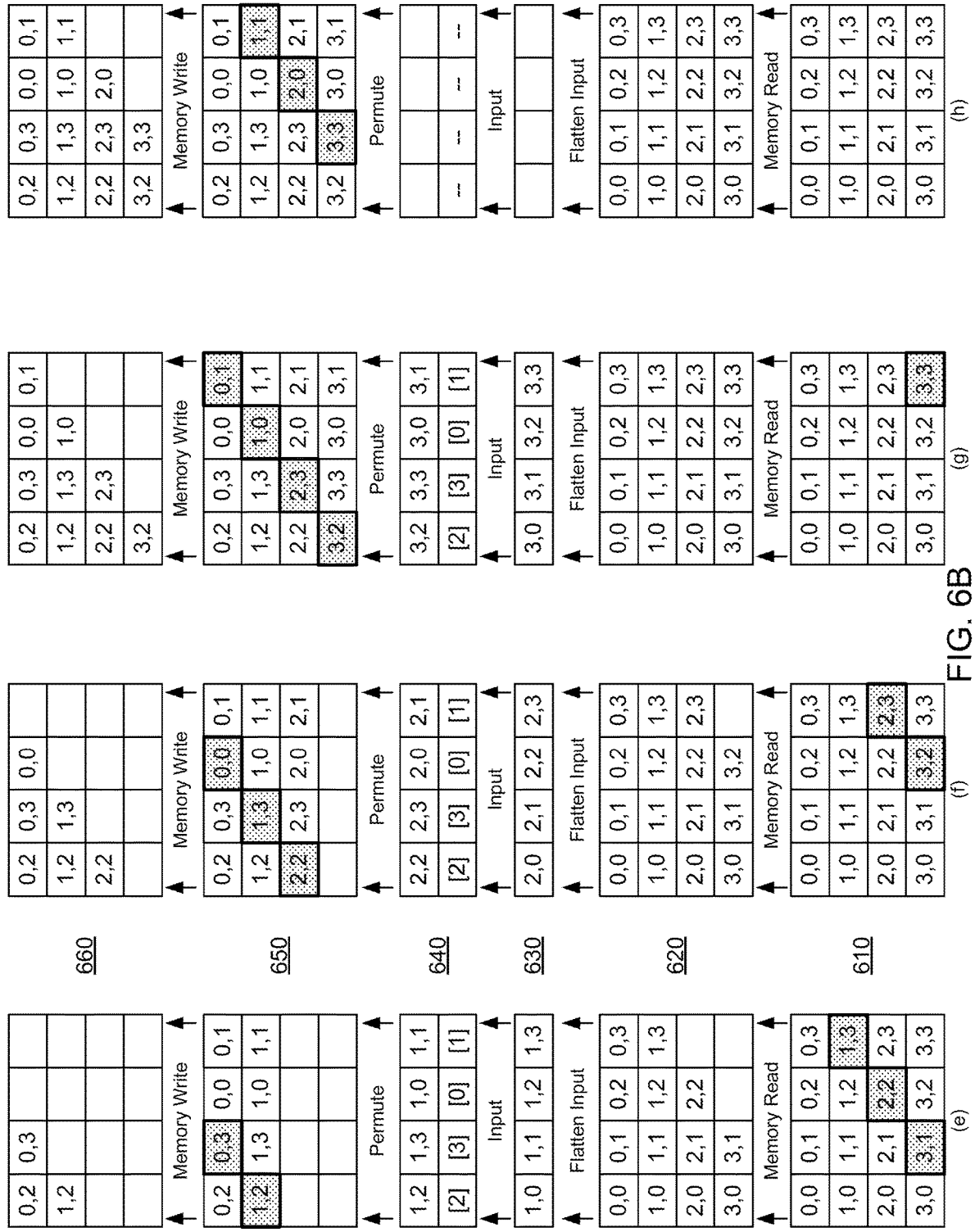
Figure 6C:
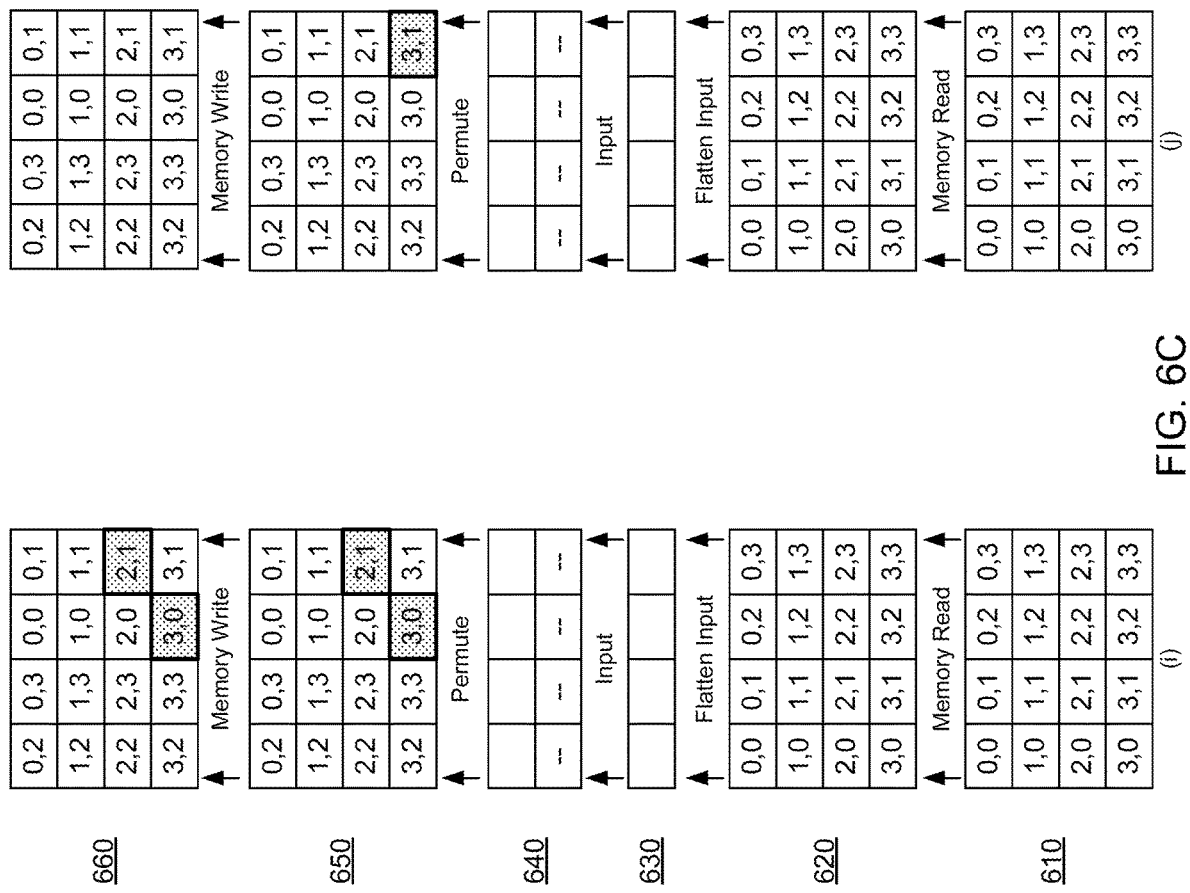

FIGS. 6A-6C show an example of permuting a matrix in a matrix-vector processor. In some implementations, the example of FIGS. 6A-6C may be performed by the matrix-vector processing system 100 of FIG. 1 that features the special-purpose hardware circuit 110 including the permute unit 120. In the example shown in FIGS. 6A-6C, an input matrix is permuted to rearrange its columns. The column permutation corresponds to a permutation in which the columns of a 4×4 input matrix are rotated by two, i.e., a permutation of an input matrix A by a permutation matrix according to A*P, where P is defined as the matrix [0 0 1 0; 0 0 0 1; 1 0 0 0; 0 1 0 0].

At each of the frames of the example shown at FIGS. 6A-6C, a memory 610, e.g., a static random-access memory (SRAM) which may be used to implement the memory 208, may be accessed by a staggered memory read flattener 620, e.g., the staggered memory read flattener 310 of FIG. 3. The staggered memory read flattener 620 as represented in FIGS. 6A-6C is for visual understanding only, and may take any number of other structures or forms to flatten data read from the memory 610. The staggered memory read flattener 620 receives data elements from the memory 610 and pops whole vectors of the input matrix received by the staggered memory read flattener 620 to the input register 630 as an input vector. A permute execution circuit 640 similar to the permute execution circuit 400 of FIG. 4 receives elements of a control vector, e.g., stored at control register. The permute execution circuit 640 also accesses vectors of elements that are provided to the input register 630, and rearranges the elements of the input vector based on the elements of the control vector. The permute execution circuit 640 provides output vectors of elements that have been rearranged to a staggered memory writer 650, similar to the staggered memory writer 370 of FIG. 3. The staggered memory writer 650 writes the vectors to a memory 660, which may also be a static random-access memory (SRAM), e.g., used to implement the memory 208. The staggered memory writer 650 may write the data corresponding to a permutation of the input matrix to the memory 660 such that the data corresponding to the permutation is staggered.

Briefly, at frame (a) shown in FIG. 6A, a first element (0,0) of the input matrix is received by the staggered memory read flattener 620 from the memory 610. Because the staggered memory read flattener 620 does not pop vectors of elements to the input register 630 until a full vector of elements of the input matrix has been received, the staggered memory read flattener 620 does not provide data to the input register 630 at this time. Similarly, the staggered memory read flattener 620 does not provide a vector of elements to the input register 630 at frame (b) or frame (c) when the staggered memory read flattener 620 reads data corresponding to second and third diagonals of the input matrix from the memory 610.

At frame (d), the staggered memory read flattener 620 receives a fourth diagonal of the input matrix from the memory 610. Thus, the staggered memory read flattener 620 has received a full vector, i.e., an entire row of the input matrix. The staggered memory read flattener 620 therefore pops the vector of elements corresponding to the first row of the input matrix to the input register 630. The permute execution circuit 640 accesses elements of a control vector that specify permutations of the vector of elements of the input matrix. In the example of FIGS. 6A-6C, the elements of the control vector accessed by the permute execution circuit 640 are shown as indications of which element of the input vector to write to each corresponding position of the output vector.

Thus, the element [2] indicates that the permute execution circuit 640 should output the element at the (0,2) position of the input register to the corresponding position of the output vector, i.e., the (0,0) position of the output vector. The element [3] indicates that the permute execution circuit 640 should output the element at the (0,3) position of the input register to the corresponding position of the output vector, i.e., the (0,1) position of the output vector. The element [0] indicates that the permute execution circuit 640 should output the element at the (0,0) position of the input vector to the corresponding position of the output vector, i.e., the (0,3) position. The element [1] of the control vector accessed by the permute execution circuit 640 indicates that the element at the (0,1) position of the input vector should be output at the (0,4) position of the output vector.

The permute execution circuit 640 permutes the vector of the input matrix as specified by the elements of the control vector to generate an output vector, and provides the output vector to the staggered memory writer 650. The staggered memory writer 650 receives the output vector and begins writing the permutation of the input matrix to memory 660 in a staggered fashion. Thus, at frame (d), the staggered memory writer 650 writes only the element (0,2) of output vector to the memory 660.

A similar process is repeated at frame (e) of FIG. 6B, where the staggered memory read flattener 620 receives a fifth diagonal of the input matrix. Having received a second vector, i.e., second row, of the input matrix, the staggered memory read flattener 620 provides the second vector to the input register 630. The permute execution circuit 640 permutes the elements of the second vector according to the control signals accessed as the elements of the control vector, and outputs the permuted second vector to the staggered memory writer 650. The staggered memory writer 650 writes a second diagonal of the permutation of the input matrix to the memory 660.

A similar process is repeated at frames (f) and (g), where the staggered memory read flattener 620 receives sixth and seventh diagonals of the input matrix to therefore receive all of the input matrix. In response, at frame (f) the third vector, i.e., row, of the input matrix is provided to the input register 630, where it is rearranged by the permute execution circuit 640 and the corresponding output vector provided to the staggered memory writer 650. At frame (g), the fourth vector, i.e., the final row, of the input matrix is provided to the input register 630, permuted by the permute execution circuit 640, and provided to the staggered memory writer 650. During these frames, the staggered memory writer 650 stores third and fourth diagonals of the permutation of the input matrix to the memory 660.

By frame (h), all of the vectors of the input matrix have been received and permuted according to the control vector. Therefore, steps (h), (i), and (j) display the staggered writing of the permutation of the input matrix by the staggered memory writer 650 to the memory 660, to thereby the full permutation of the input matrix in the memory 660. The permutation of the input matrix may be provided as a response to a request received by the system, i.e., the matrix-vector processing system 100, or may be provided as an input to a subsequent matrix computation performed by the matrix-vector processing system 100 in responding to a computation request.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A special-purpose hardware integrated circuit, the circuit comprising:
   a memory configured to store an input matrix and an output matrix;
   a permute unit coupled to the memory, wherein the permute unit comprises:
      an input register that stores input vectors corresponding to the input matrix;
      a control register configured to store a control vector of control signals;
      a permute execution circuit coupled to the input register and the control register, the permute execution circuit being configured to:
         i) compute a matrix permutation of the input matrix by permuting the input vectors based on the control signals of the control vector; and
         ii) generate the output matrix as a permutation of the input matrix.

2. The circuit of claim 1, wherein the permute execution circuit computes the matrix permutation of the input matrix by multiplying, in hardware, the input matrix with a permutation matrix.

3. The circuit of claim 2, wherein:
   i) the permutation matrix is an identity matrix comprising an n×n matrix that has a plurality of ones, "1s", along a principal diagonal of the identity matrix; and
   ii) the principal diagonal extends from a (0,0) position to the (n,n) position of the identity matrix.

4. The circuit of claim 1, wherein the permute unit is configured to perform an entire permutation of the input matrix based on a set of received information and without additional instructions from a source external to the permute unit.

5. The circuit of claim 4, wherein the set of received information comprises control signals, a matrix input, a vector input, and permutation parameters.

6. The circuit of claim 5, wherein the permutation parameters comprise a permutation matrix comprising data that indicates whether the matrix permutation is a row permutation or a column permutation.

7. The circuit of claim 5, wherein the control vector of control signals is generated based on the permutation parameters.

8. The circuit of claim 7, wherein the control vector of control signals comprises elements that specify a number of positions to rotate corresponding elements of the input vectors that correspond to the input matrix.

9. The circuit of claim 7, wherein the control vector of control signals comprises elements that represent pointers to where elements of the input vectors corresponding to the input matrix are to be stored in a memory of the special-purpose hardware integrated circuit.

10. The circuit of claim 7, wherein:
    i) the control signals of the control vector are represented by data stored in the control register; and
    ii) the data representing the control signals is used for controlling the permute execution circuit to perform a permutation of the input vectors stored in the input register.

11. The circuit of claim 7, wherein the control vector of control signals comprises elements that indicate positions where corresponding elements of the input vectors are to be included and stored in an output vector of the output matrix.

12. The circuit of claim 7, wherein the permute execution circuit comprises:
    a plurality of multiplexors that are coupled to the input register, each of the plurality of multiplexors being configured to:
       i) receive elements of an input vector stored in the input register; and
       ii) generate an output vector that is a permutation of the input vector stored in the input register.

13. The circuit of claim 12, the plurality of multiplexors corresponds to a number of elements of the input register.

14. The circuit of claim 12, wherein:
    i) each of the plurality of multiplexors is configured as an n-to-one multiplexor; and ii) n corresponds to a dimension of the input matrix that the permute unit is configured to process.

15. The circuit of claim 14, wherein the control signals of the control vector stored at the control register are used in controlling outputs of the plurality of multiplexors of the permute execution circuit.

* * * * *